US008570684B1

(12) United States Patent
Contreras et al.

(10) Patent No.: US 8,570,684 B1
(45) Date of Patent: Oct. 29, 2013

(54) IMPLEMENTING INTEGRATED SPIN-TORQUE OSCILLATOR AND INTERFACE BIAS CONTROL FOR HARD DISK DRIVES

(71) Applicant: HGST Netherlands B.V., Amsterdam (NL)

(72) Inventors: John Thomas Contreras, Palo Alto, CA (US); Ikuya Tagawa, Kanagawa (JP); Albert John Wallash, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/646,614

(22) Filed: Oct. 5, 2012

(51) Int. Cl.
*G11B 5/127* (2006.01)

(52) U.S. Cl.
USPC ...................................... 360/110; 360/125.16

(58) Field of Classification Search
None
See application file for complete search history.

(56) References Cited

U.S. PATENT DOCUMENTS

| 8,325,442 | B2 * | 12/2012 | Koui et al. | 360/128 |
| 8,345,380 | B2 * | 1/2013 | Sato et al. | 360/110 |
| 2012/0069465 | A1 * | 3/2012 | Sato et al. | 360/77.02 |
| 2012/0268844 | A1 * | 10/2012 | Yamada et al. | 360/125.3 |

* cited by examiner

*Primary Examiner* — Paul Huber
(74) *Attorney, Agent, or Firm* — Joan Pennington (57) ABSTRACT

A method, apparatus, and system for implementing spin integrated spin-torque oscillator (STO) with an interface bias control for hard disk drives. Bias circuitry for a spin-torque oscillator (STO) is integrated with a slider for microwave assisted magnetic recording (MAMR). The slider includes read and write transducers and the integrated STO bias circuitry controls a bias potential applied to a write return pole to the write transducer with respect to a disk.

22 Claims, 7 Drawing Sheets

IMPLEMENTING INTEGRATED SPIN-TORQUE OSCILLATOR AND INTERFACE BIAS CONTROL FOR HARD DISK DRIVES

FIELD OF THE INVENTION

The present invention relates generally to the data storage field, and more particularly, relates to a method, apparatus, and system for implementing integrated spin-torque oscillator (STO) with an interface bias control for hard disk drives.

DESCRIPTION OF THE RELATED ART

In hard disk drives (HDDs) or a disk-drive system, read and write transducers reside in a slider which flies over a recording media or disk surface. The fly-height of the slider-to-disk has become smaller as storage densities continue to increase and fly-heights decrease.

The potential of the slider and the read and write transducers with respect to the disk or media potential are important to avoid the exchange of material, such as corrosion, lube pickup, and/or electrical breakdown, or electrostatic discharge (ESD) to the disk.

In addition, microwave assisted magnetic recording (MAMR) requires a spin-torque oscillator (STO) bias voltage that affects a pole potential of the write transducer, which is currently not utilized for controlling the interface potential with respect to the potential of the disk.

Therefore a means of controlling the potential of the transducers and slider is required to maintain good interface performance and prevent ESD damage to the write poles and disk with Spin-Torque Oscillator (STO) sensors for microwave assisted magnetic recording (MAMR) in hard disk drives.

A need exists for effective mechanism for implement bias circuitry for spin-torque oscillator for microwave assisted magnetic recording (MAMR). It is desirable to provide such mechanism to allow for efficient and effective biasing operation.

SUMMARY OF THE INVENTION

Aspects of the present invention are to provide a method, apparatus, and system for implementing integrated spin-torque oscillator with an interface bias control for hard disk drives. Other important aspects of the present invention are to provide such method, apparatus, and system substantially without negative effect and to overcome some of the disadvantages of prior art arrangements.

In brief, a method, apparatus, and system for implementing spin integrated spin-torque oscillator (STO) with an interface bias control for hard disk drives. Bias circuitry for a spin-torque oscillator (STO) is integrated with a slider for microwave assisted magnetic recording (MAMR). The slider includes a spin-torque oscillator (STO) element and read and write transducers and the integrated STO bias circuitry controls a STO bias potential applied to a write return pole with respect to a disk.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the embodiments of the invention, a method, apparatus, and system for implementing integrated spin torque oscillator (STO) and interface bias control for microwave assisted magnetic recording (MAMR) for hard disk drives (HDDs) are provided. The integrated spin torque oscillator (STO) and interface bias control effectively control the potential of hard drive read and write transducers and the slider required to maintain good interface performance and prevent electrostatic discharge (ESD) damage to the write poles and/or disk.

Figure 1A:
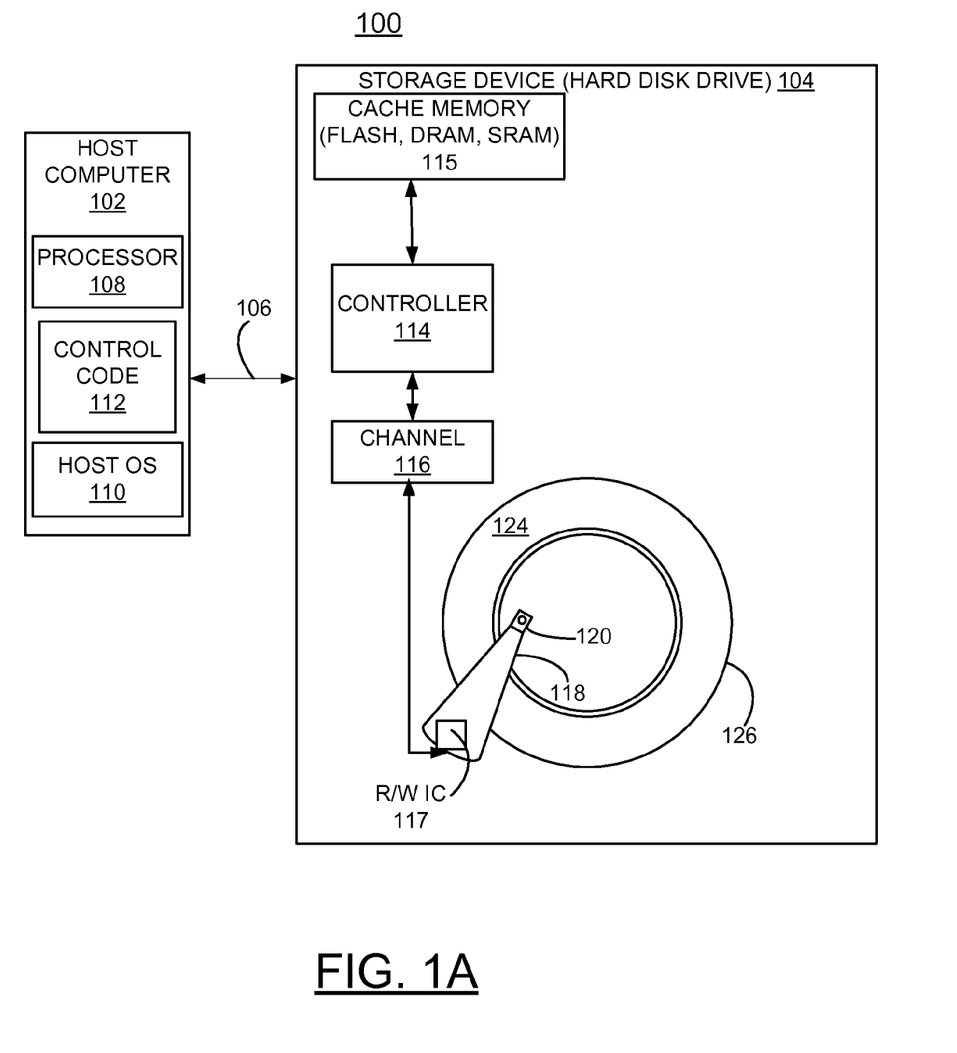
FIG. 1A is a block diagram representation illustrating a system for implementing an integrated spin torque oscillator (STO) and interface bias control in accordance with an embodiment of the invention.

Having reference now to the drawings, in FIG. 1A, there is shown an example system generally designated by the reference character 100 for implementing an integrated spin torque oscillator (STO) and interface bias control for microwave assisted magnetic recording (MAMR) in accordance with an embodiment. System 100 includes a host computer 102, a storage device 104, such as a hard disk drive (HDD) 104, and an interface 106 between the host computer 102 and the storage device 104.

As shown in FIG. 1A, host computer 102 includes a processor 108, a host operating system 110, and control code 112. The storage device or hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing the integrated STO bias circuitry in accordance with an embodiment of the invention. The storage device or hard disk drive 104 includes an arm 118 carrying a novel slider 120 for implementing an integrated spin torque oscillator (STO) and interface bias control in accordance with an embodiment of the invention. Slider 120 contains read and write transducers and integrated spin torque oscillator (STO) and interface bias control circuitry in accordance with an embodiment of the invention and flies over a writable disk surface 124 of a disk 126.

Figure 1B:
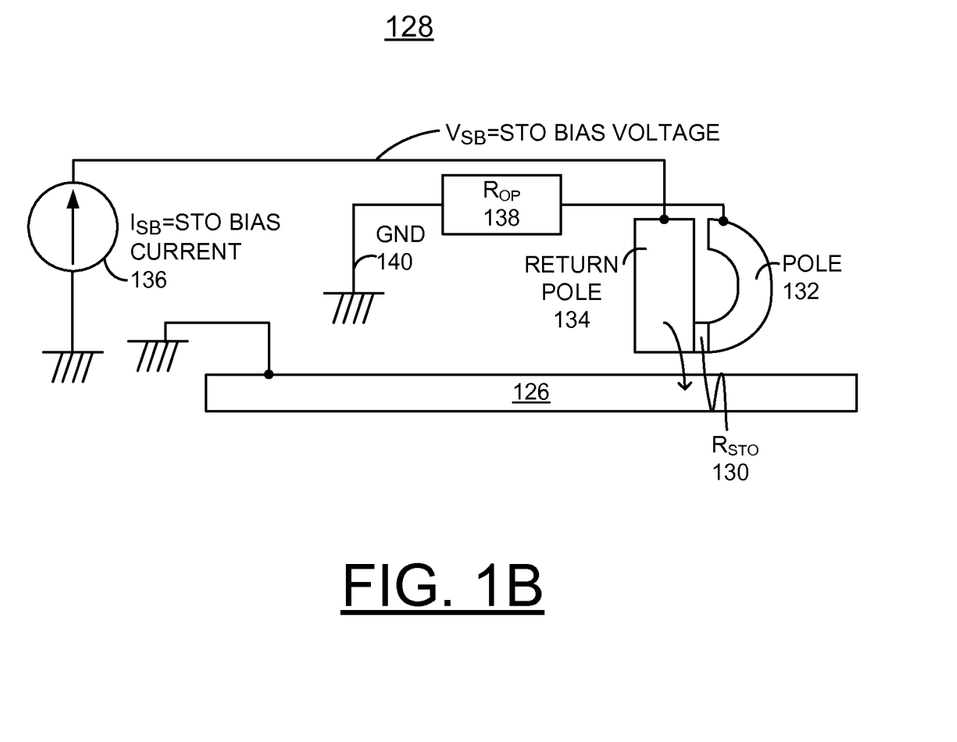
FIG. 1B schematically illustrates not to scale an example circuit with an integrated spin torque oscillator (STO) and interface bias control for hard disk drives (HDDs) in accordance with an embodiment of the invention.

In FIG. 1B, there is an example circuit with an integrated spin torque oscillator (STO) and interface bias control generally designated by the reference character 128 for hard disk drives (HDDs), such as hard disk drive 104 in accordance with an embodiment of the invention. The integrated-STO-bias (ISB) circuit 128 advantageously is used for microwave assisted magnetic recording (MAMR) and provided with the novel slider 120 in accordance with an embodiment of the invention.

ISB circuit 128 includes a spin torque oscillator (STO) element $R_{STO}$ 130, a write yoke or pole 132, and a return pole 134. ISB circuit 128 includes an ISB bias current source $I_{SB}$ 136 connected to and providing STO bias current to the return pole 134 at a node STO bias voltage $V_{SB}$. ISB circuit 128 includes an off-set potential resistor $R_{OP}$, 138 connected to the pole 132, and connected to a ground potential GND 140, and the disk 126 connected to the ground potential.

It should be understood that a variation ISB circuit 128 can be provided to bias the STO differentially in accordance with an embodiment of the invention. The differential bias scheme would reduce the write pole-to-disk voltage by half. Another input line/pad is required, replacing the $R_{OP}$, 138 to ground connection 140, as shown in FIG. 1B. This differential bias scheme would be required in HDDs, for example, when carbon overcoat thickness on the head and disk are reduced, which will decrease the head-to-disk breakdown voltage.

In accordance with features of the embodiments of the invention, ISB circuit 128 biases the STO element $R_{STO}$ 130 by utilizing the write yoke 132 and return pole 134 of the write element.

Figure 2A:
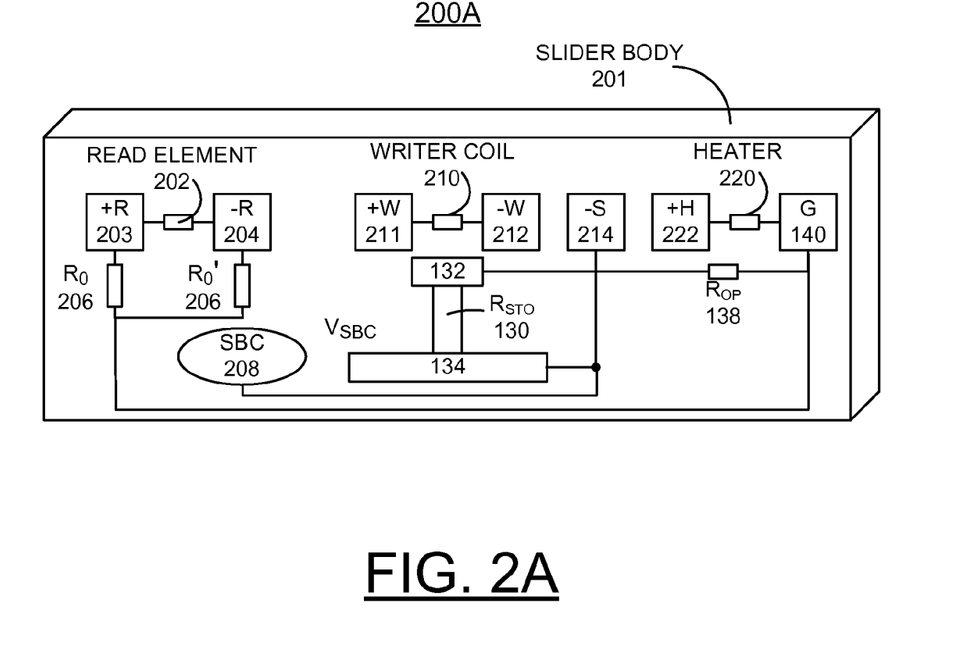
FIG. 2A is a schematic and block diagram representation illustrating an example slider STO and interface bias control circuit for disk drives (HDDs) in accordance with an embodiment of the invention.

In accordance with features of the embodiments of the invention, the ISB circuit 128 as implemented and illustrated with respect to the slider STO and interface bias control circuit 300 of FIG. 2A includes ISB architecture has the following characteristics: slider connections to ISB bias line; slider connection with high-frequency low-impedance path to the system ground; slider transducer connections to a common potential that connects to ISB bias line and voltage potential ISB bias current $I_{SB}$ and voltage $V_{SB}$; and a Read/Write integrated circuit (IC) with STO bias circuit to provide the bias for the write return pole and other transducers.

Referring also to FIG. 2A, there is shown a more detailed example slider STO and interface bias control circuit generally designated by the reference character 200A for disk drives (HDDs) in accordance with an embodiment of the invention. The slider STO and interface bias control circuit 200 illustrates the ISB slider design with added connections to a slider body 201 and the ISB bias current source $I_{SB}$ 136 connection to read element 202, and the added off-set potential resistor $R_{OP}$, 138 of the invention. The STO bias is typically <300 mV and the contact potential for the slider and disk is <−300 mV. Therefore, the off-set potential resistor $R_{OP}$, 138 of the invention provides added DC drop to the desired potential.

Figure 2B:
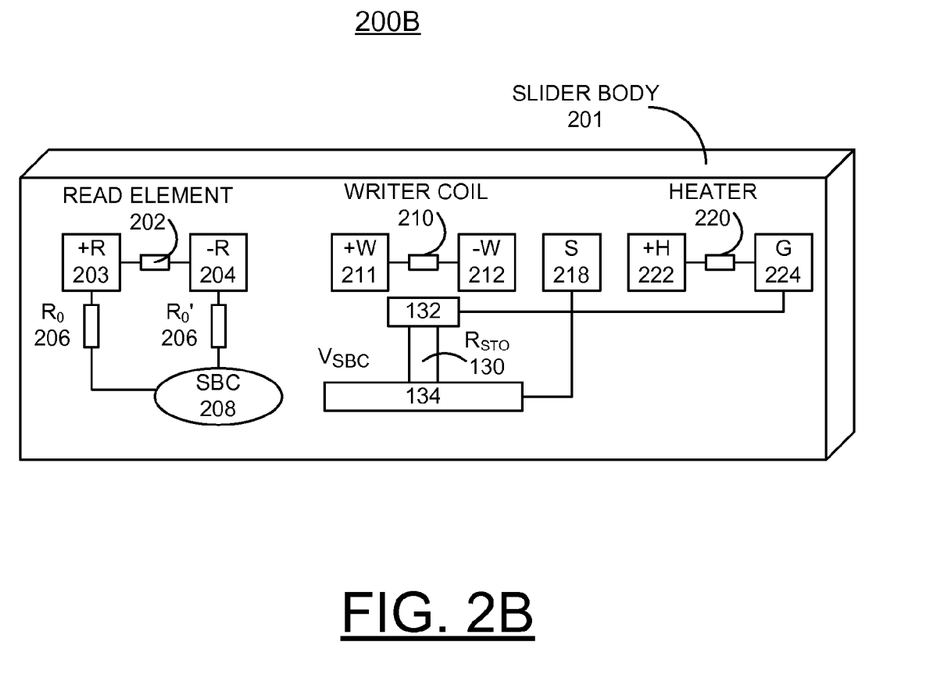
FIG. 2B is a schematic and block diagram representation illustrating a slider connection arrangement for STO for disk drives (HDDs) without an integrated ISB bias circuitry, and an added off-set potential resistor in accordance with an embodiment of the invention.

Referring also to FIG. 2B, there is shown a slider configuration circuit for STO for disk drives (HDDs) generally designated by the reference character 200B without the STO bias circuitry ISB bias current source $I_{SB}$ 136 connection, and without the added off-set potential resistor $R_{OP}$, 138 of the invention. The same reference characters are used in FIGS. 2A, and 2B, for similar or identical components.

In FIG. 2A, the slider STO and interface bias control circuit 200A includes a read element 202 connected between read elements pads +R 203 and −R 204 coupled by respective resistors $R_0$, 206 and $R_0$, 206 to a slider body contact (SBC) 208. The slider STO and interface bias control circuit 200 includes writer element 210, and write pads +W 211, −W 212. An STO pad −S 214 is the ISB bias connection to current $I_{SB}$ and/or voltage $V_{SB}$ input connected to the return pole 134, and SBC 208. The slider STO and interface bias control circuit 200 includes fly-height control heater element 220 and connection pad +H 222 and the ground potential GND pad 140, as shown in FIG. 2A. The off-set potential resistor $R_{OP}$, 138 of the invention is connected between the heater element ground potential GND pad 140 and the pole 132. The SBC potential with respect to the disk 126 can then be controlled through the STO pad −S 214 from the STO bias 136.

In FIG. 2B, the slider configuration circuit 200B for STO includes STO pad S 218 that is connected to the return pole 134, conventional fly-height control heater element 220, the ground pad 224, and a direct connect to the write pole 132 without the off-set potential resistor $R_{OP}$, 138 of the invention shown in FIG. 2A. For the configuration circuit 200B of FIG. 2B the SBC potential with respect to the disk 126 can then be controlled through the common-mode potential of read element 202 from the R/W IC 117.

Figure 2C:
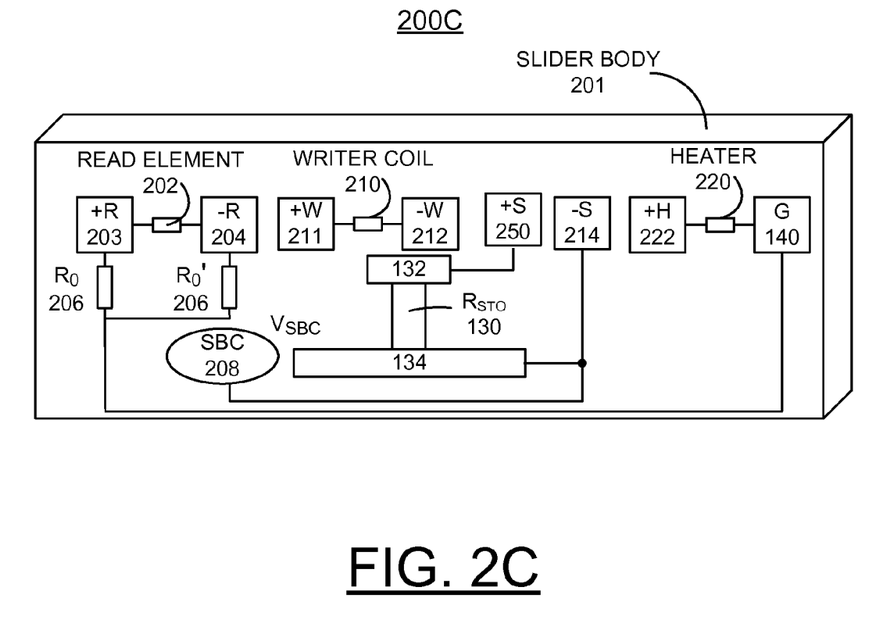
FIG. 2C is a schematic and block diagram representation illustrating another example slider configuration circuit for STO including an added STO pad for independent STO and SBC bias potential for disk drives (HDDs) in accordance with an embodiment of the invention.

In FIG. 2C, a slider configuration circuit 200C for STO includes an added STO pad +S 250 that is connected to the write pole 132. For the configuration circuit 200C like in slider configuration circuit 200A of FIG. 2A, the SBC potential with respect to the disk 126 can then be controlled through the STO pad −S 214 from the STO bias 136, with the added feature of independent STO and SBC bias potential.

Figure 3:
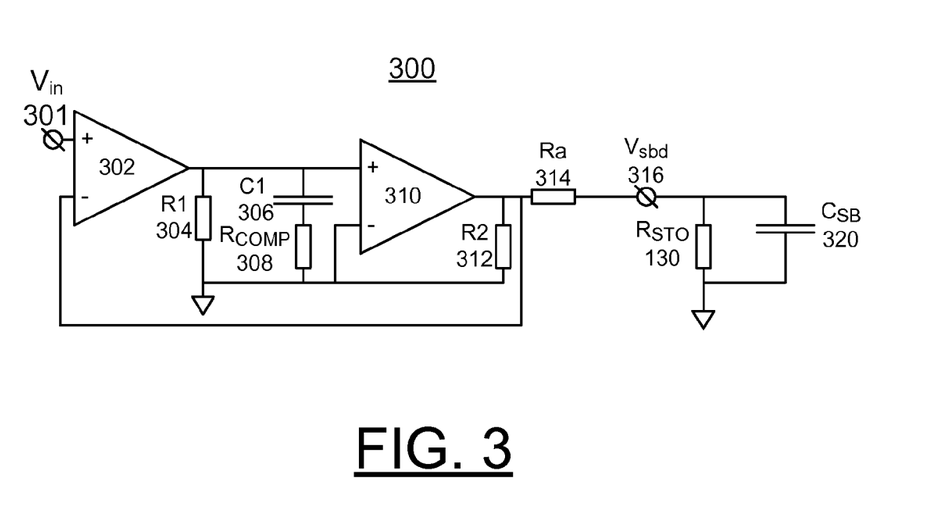
FIG. 3 is a block diagram representation illustrating an example architecture of an ISB circuit for the STO and interface bias control circuit of FIGS. 1B and 2A for disk drives (HDDs) in accordance with an embodiment of the invention.

Referring also to FIG. 3, there is shown an example circuit architecture generally designated by the reference character 300 for disk drives (HDDs) for the illustrated ISB circuits 128, 200 in accordance with an embodiment of the invention. The integrated STO bias circuitry 300 includes the Read/Write integrated circuit (IC) 117 implementing the integrated STO bias circuitry.

The integrated STO bias circuitry 300 includes a first transconductance amplifier 302 having a current bias Vin, 301 applied to a first + input and an output connected to a bias resistor R1, 304, and parallel connected capacitor C1, 306 and compensation resistor Rcomp, 308 connected between the output and ground. A second transconductance amplifier 310 has a first + input connected to the output of the first transconductance amplifier 302, and having an output connected to a load resistor R2, 312 and an output compensation resistor Ra 314 and applied to a second − input of the first transconductance amplifier 302. The output compensation resistor Ra, 314 is connected to a current bias Vsbd, 316 connected to the STO element $R_{STO}$, 130, and a parallel parasitic capacitor $C_{SB}$, 320.

The integrated STO bias circuitry 300 includes an overall Laplace transfer function represented by $$Vsbd/Vin=(gm_1R_1gm_2R_2)/(R_1C_1s+gm_1R_1gm_2R_2)$$

where $gm_1$ and $gm_2$ represent gain of the transconductance amplifiers 302, 310, and $R_1 C_1$ s and $R_2$ represent biasing and feedback resistors R1, 304, R2, 312 and capacitor C1, 306 input to transconductance amplifier 310.

Figure 4A:
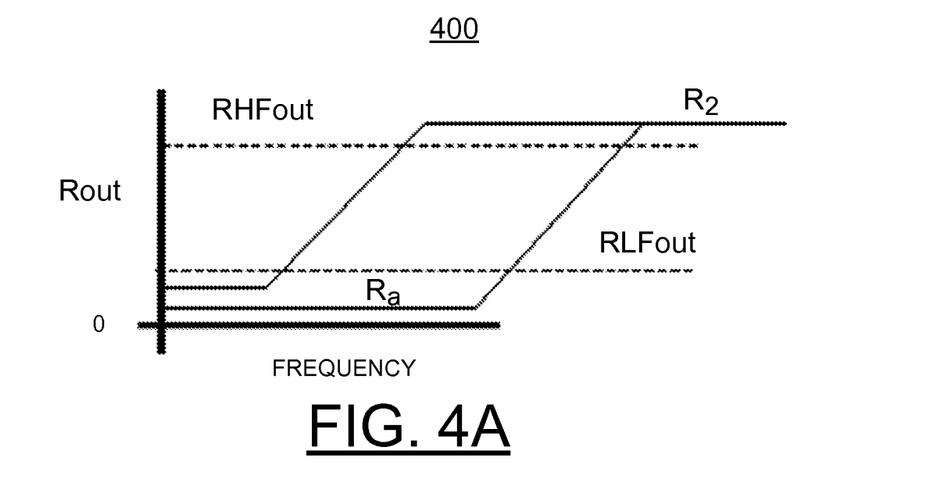
FIGS. 4A, and 4B respectively illustrating output impedance and loop gain of the example architecture of the ISB circuit of FIG. 3 in accordance with an embodiment of the invention.
Figure 4B:
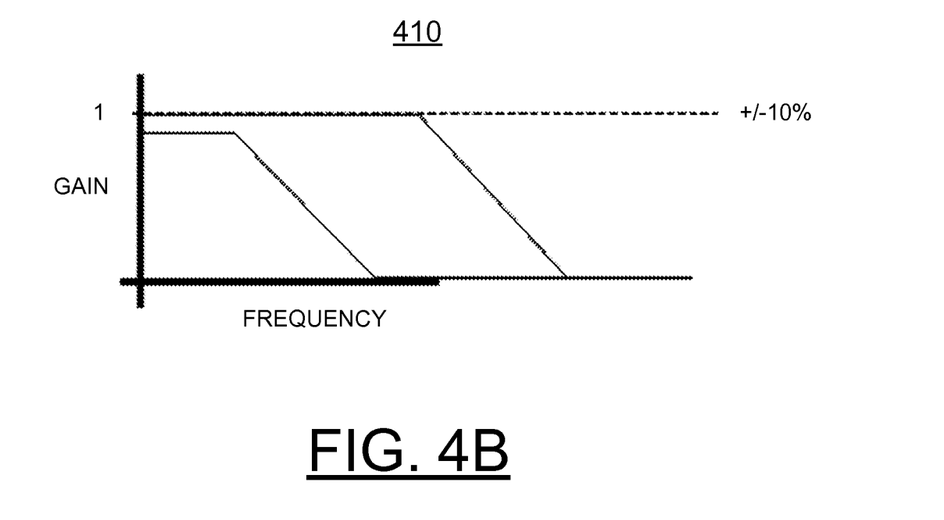

Referring also to FIGS. 4A, and 4B, output impedance and loop gain are respectively illustrated of the example circuit 300 of FIG. 3 in accordance with an embodiment of the invention.

In FIG. 4A, output impedance generally designated by the reference character 400 is illustrated with frequency shown relative to the horizontal axis, and Rout shown relative to the vertical axis.

In FIG. 4B, loop gain generally designated by the reference character 410 is illustrated with frequency shown relative to the horizontal axis, and gain shown relative to the vertical axis.

In the integrated STO bias circuitry 300, the feedback controls the DC and low-frequency response, and at higher frequencies capacitor C1 disconnects the feedback. With the transconductance amplifiers 302, 310 and respective gain gm1 and gm2; the loop gain can be programmable by adjusting one or both of their current biases Vin, 301, and Vsbd, 316.

By adjusting the loop gain, the characteristics for the output impedance and bandwidth changes, as illustrated in FIG. 4A. A low-loop gain increases the output impedance at low frequencies and allows for a wider range for the open-loop output impedance R2, 312. Also, the low-loop gain reduces the bandwidth of the AC transfer. A high-loop gain decreases and widens the frequency range of output impedance to the Ra, 314 level, which can be included to reduce the effects of having the capacitive load Csb, 320. With the high-loop gain, as illustrated in FIG. 4B the bandwidth increases, and the resistance Rcomp, 308 is included in case compensation is required for a large capacitive load. The adjustability of the loop gain allows for fast recovery, and with circuit short circuit protection, RHFout as illustrated in FIG. 4A, in the event of a contact asperity by limiting the current output.

While the present invention has been described with reference to the details of the embodiments of the invention shown in the drawing, these details are not intended to limit the scope of the invention as claimed in the appended claims.

What is claimed is:

1. A method for implementing an integrated spin-torque oscillator (STO) with an interface bias control for hard disk drives comprising:
   providing integrated bias circuitry for the spin-torque oscillator (STO) coupled a slider for microwave assisted magnetic recording (MAMR);
   providing a read transducer and a write transducer with the slider; said write transducer including a write pole and a write return pole; and
   controlling a bias potential applied to said write return pole with respect to a disk media with said integrated STO bias circuitry.

2. The method as recited in claim 1 includes providing a spin-torque oscillator (STO) element coupled between said write pole and said write return pole.

3. The method as recited in claim 1 wherein providing integrated bias circuitry for the spin-torque oscillator (STO) coupled a slider for microwave assisted magnetic recording (MAMR includes implementing said integrated STO bias circuitry in a Read/Write integrated circuit (IC).

4. The method as recited in claim 1 wherein providing integrated bias circuitry for the spin-torque oscillator (STO) coupled a slider for microwave assisted magnetic recording (MAMR) includes implementing said integrated STO bias circuitry with at least one slider connection to an ISB bias line.

5. The method as recited in claim 1 wherein providing integrated bias circuitry for the spin-torque oscillator (STO) coupled a slider for microwave assisted magnetic recording (MAMR) includes providing a slider connection with high-frequency low-impedance path to the system ground.

6. The method as recited in claim 1 wherein providing integrated bias circuitry for the spin-torque oscillator (STO) coupled a slider for microwave assisted magnetic recording (MAMR) includes providing at least one slider connection with a transducer connection to a common potential connecting to an ISB bias line and voltage potential.

7. The method as recited in claim 1 wherein controlling said bias potential applied to said write return pole with respect to said disk with said integrated STO bias circuitry includes providing a controllable bias potential with respect to media of less than one Volt, to prevent head-to-disk breakdown electrostatic discharge (ESD) damage.

8. The method as recited in claim 1 wherein controlling said bias potential applied to said write return pole with respect to said disk with said integrated STO bias circuitry includes providing current limit protection for conductive asperities to the disk.

9. The method as recited in claim 1 wherein controlling said bias potential applied to said write return pole with respect to said disk with said integrated STO bias circuitry includes providing a voltage offset resistor bias to said write pole.

10. The method as recited in claim 1 wherein controlling said bias potential applied to said write return pole with respect to said disk with said integrated STO bias circuitry includes providing an independent STO bias potential coupled by an independent STO pad connected to said write pole.

11. An apparatus for implementing an integrated spin-torque oscillator (STO) with an interface bias control for hard disk drives comprising:
   a slider including a read transducer and a write transducer; said write transducer including a write pole and a write return pole;
   the spin-torque oscillator (STO) integrated with said slider for microwave assisted magnetic recording (MAMR);
   STO bias circuitry coupled to said slider and controlling a bias potential applied to said write return pole with respect to a disk media with said integrated STO bias circuitry.

12. The apparatus as recited in claim 11 includes a spin-torque oscillator (STO) element coupled between said write pole and said write return pole.

13. The apparatus as recited in claim 11 includes a Read/Write integrated circuit (IC) implementing said integrated STO bias circuitry.

14. The apparatus as recited in claim 11 wherein said integrated STO bias circuitry includes at least one slider connection to an ISB bias line.

15. The apparatus as recited in claim 11 wherein said integrated STO bias circuitry includes a slider connection with high-frequency low-impedance path to the system ground.

16. The apparatus as recited in claim 11 wherein said integrated STO bias circuitry includes a pair of transconductance amplifiers with current biases and feedback for providing adjustability of loop gain, and characteristic changes for output impedance and bandwidth.

17. The apparatus as recited in claim 16 wherein said integrated STO bias circuitry includes an overall Laplace transfer function represented by $$Vsbd/Vin = (gm_1 R_1 gm_2 R_2)/(R_1 C_1 s + gm_1 R_1 gm_2 R_2)$$

where $gm_1$ and $gm_2$ represent gain of said transconductance amplifiers, and $R_1$ $C_1$ s and $R_2$ represent biasing and feedback resistors and capacitance.

18. The apparatus as recited in claim 11 includes a voltage offset resistor bias coupled between said write pole and a system ground potential.

19. The apparatus as recited in claim 11 includes an independent STO bias potential coupled by an independent STO pad connected to said write pole.

20. A system for implementing an integrated spin-torque oscillator (STO) with an interface bias control for hard disk drives comprising:
- at least one disk; said disk including a disk media for storing data;
- a slider including a read transducer and a write transducer; said write transducer including a write pole and a write return pole;
- the spin-torque oscillator (STO) integrated with said slider for microwave assisted magnetic recording (MAMR);
- STO bias circuitry coupled to said slider and controlling a bias potential applied to said write return pole with respect to a disk media with said integrated STO bias circuitry.

21. The system as recited in claim 20 includes a spin-torque oscillator (STO) element coupled between said write pole and said write return pole.

22. The system as recited in claim 20 includes a Read/Write integrated circuit (IC) implementing said integrated STO bias circuitry.

* * * * *